(12) United States Patent
Oguchi

(10) Patent No.: US 8,009,614 B2
(45) Date of Patent: Aug. 30, 2011

(54) MOBILE COMMUNICATIONS SYSTEM CONFORMING TO MOBILE IP, AND HOME AGENT, MOBILE NODE AND METHOD USED IN THE MOBILE COMMUNICATIONS SYSTEM

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1034 days.

(21) Appl. No.: 11/878,928

(22) Filed: Jul. 27, 2007

(65) Prior Publication Data

US 2008/0062917 A1     Mar. 13, 2008

(30) Foreign Application Priority Data

Sep. 7, 2006   (JP) .................................. 2006-242830

(51) Int. Cl.
*H04W 4/00*   (2009.01)
(52) U.S. Cl. .................... 370/328; 370/338; 370/331
(58) Field of Classification Search .................. None
See application file for complete search history.

(56) References Cited

U.S. PATENT DOCUMENTS

| | | | | |
|---|---|---|---|---|
| 7,031,275 B1* | 4/2006 | Borella et al. | ................ | 370/328 |
| 7,286,520 B2* | 10/2007 | Takeda et al. | ................ | 370/349 |
| 7,321,587 B2* | 1/2008 | Gao et al. | ................ | 370/388 |
| 7,496,071 B2 | 2/2009 | Yamada et al. | | |
| 7,510,113 B2* | 3/2009 | Igarashi et al. | ................ | 235/379 |
| 2002/0188562 A1* | 12/2002 | Igarashi et al. | ................ | 705/40 |
| 2003/0026241 A1* | 2/2003 | Ono et al. | ................ | 370/349 |
| 2004/0098507 A1* | 5/2004 | Thubert et al. | ................ | 709/245 |
| 2004/0170133 A1 | 9/2004 | Oguchi et al. | | |
| 2005/0047409 A1 | 3/2005 | Kawasaki et al. | | |
| 2005/0220124 A1 | 10/2005 | Oguchi et al. | | |
| 2006/0002344 A1* | 1/2006 | Ono et al. | ................ | 370/331 |
| 2006/0018273 A1* | 1/2006 | Yamada et al. | ................ | 370/328 |
| 2006/0039335 A1* | 2/2006 | Ono et al. | ................ | 370/338 |

FOREIGN PATENT DOCUMENTS

| | | |
|---|---|---|
| JP | 2002/542721 | 12/2002 |
| JP | 2004/320694 | 11/2004 |
| JP | 2005/72701 | 3/2005 |
| JP | 2005/295125 | 10/2005 |

(Continued)

OTHER PUBLICATIONS

Yuuji Fukunaga, "Part.3 Examine the mechanism of Mobile IP technically", searched on Jun. 22, 2006, (http://www.atmarkit.cojp/fnetwork/tokusyuu/15mobileip/mip03.html).

(Continued)

*Primary Examiner* — Steven H Nguyen
(74) *Attorney, Agent, or Firm* — Murphy & King, P.C.

(57) ABSTRACT

A home agent used in a mobile communications system conforming to Mobile IP is disclosed. A mobile node belongs to the home agent, and the home agent has a global IP address that is a home address common to a plurality of mobile nodes. The home agent includes: an interface unit configured to route a received packet according to a transfer table that includes a correspondence among a home address of the mobile node, a care of address of the mobile node, and a communication session identification number for identifying a communication session opened by an application of the mobile node, wherein a transfer destination of the received packet is identified by a combination of the care of address and the communication session identification number; and a location information management unit configured to manage the transfer table.

21 Claims, 13 Drawing Sheets

FOREIGN PATENT DOCUMENTS

JP    2006033541    2/2006

OTHER PUBLICATIONS

IETF( Internet Engineering Task Force), RFC (Request for Comments) 3220, searched on Jun. 22, 2006, (http://www.ietf.org/rfc/frc3220.tx?number=3220).

IETF (Internet Engineering Task Force), RFC (Request for Comments) 3775, searched on Jun. 22, 2006, (http://www.ietf.org/rfc/rfc3775.txt?number=3775).

Partial English Translation of the Japanese Patent Office Action dated Jan. 18, 2011, in corresponding Patent Application No. 2006-242830.

* cited by examiner

FIG.9

| FIELD | VALUE (EXAMPLE) |
|---|---|
| TYPE | 1.REGISTRATION |
| FLAG | M\|D |
| EFFECTIVE REGISTRATION TERM | 600 SECONDS |
| HOME ADDRESS | 133.160.10.1 |
| HOME AGENT | 133.160.10.1 |
| REQUEST IDENTIFIER | 64BITS RANDOM NUMBER |
| EXTENSION | |
| PROTOCOL/PORT NUMBER (TLV) | UDP/5064 |

FIG.10

| | |
|---|---|
| S | REQUEST SIMULTANEOUS BINDING (NOT DISCARD PREVIOUS MOVE DESTINATION INFORMATION) |
| B | REQUEST HOME AGENT TO TRANSFER BROADCAST |
| D | MOBILE TERMINAL RELEASES ENCAPSULATION BY ITSELF |
| M | REQUEST USE OF MINIMUM ENCAPSULATION |
| G | REQUEST USE OF GRE ENCAPSULATION |
| V | REQUEST USE OF VAN JACOBSON HEADER COMPRESSION |

FIG.11

| FIELD | VALUE (EXAMPLE) |
|---|---|
| TYPE | 3. REGISTRATION RESPONSE |
| RESULT CODE | 0(SUCCEED) |
| EFFECTIVE REGISTRATION TERM | 600 SECONDS |
| HOME ADDRESS | 133.160.10.1 |
| HOME AGENT | 133.160.10.1 |
| PORT NUMBER | 5064 |
| REQUEST IDENTIFIER | 64BITS RANDOM NUMBER |
| EXTENSION | |

FIG.12

| TERMINAL NUMBER | IP ADDRESS | SIP PORT |
|---|---|---|
| 1111 | 133.160.10.1 | 5064 |
| 2222 | 140.170.20.2 | 5067 |

FIG.13

| DESTINATION IP OF PACKET (HoA=GW ADDRESS) | PROTOCOL | DESTINATION PORT OF PACKET | CoA (TRANSFER DESTINATION) |
|---|---|---|---|
| 133.160.10.1 | UDP | 5064 | 140.170.10.5 |

FIG.14

| DESTINATION IP OF PACKET (HoA=GW ADDRESS) | PROTOCOL | DESTINATION PORT OF PACKET | CoA (TRANSFER DESTINATION) |
|---|---|---|---|
| 133.160.10.1 | UDP | 5064 | 140.170.10.5 |
| 133.160.10.1 | UDP | 10000 | 140.170.10.5 |

FIG.15

| FIELD | VALUE (EXAMPLE) |
|---|---|
| TYPE | 1.REGISTRATION |
| FLAG | M\|D |
| EFFECTIVE REGISTRATION TERM | 600 SECONDS |
| HOME ADDRESS | 133.160.10.1 |
| HOME AGENT | 133.160.10.1 |
| REQUEST IDENTIFIER | 64BITS RANDOM NUMBER |
| EXTENSION | |
| PROTOCOL/PORT NUMBER (TLV) | UDP/5064 |
| PROTOCOL/PORT NUMBER (TLV) | UDP/10000 |

FIG.16

| HoA | PORT | CoA |
|---|---|---|
| 133.160.10.1 | 5064 | 140.170.10.5 |
| 133.160.10.1 | 10000 | 140.170.10.5 |

FIG.17

| DESTINATION IP OF PACKET (HoA=GW ADDRESS) | PROTOCOL | DESTINATION PORT OF PACKET | CoA (TRANSFER DESTINATION) |
|---|---|---|---|
| 133.160.10.1 | UDP | 5064 | 136.100.20.70 |
| 133.160.10.1 | UDP | 10000 | 136.100.20.70 |

FIG.18

| FIELD | VALUE (EXAMPLE) |
|---|---|
| TYPE | 1.REGISTRATION |
| FLAG | M|D |
| EFFECTIVE REGISTRATION TERM | 0 SECOND |
| HOME ADDRESS | 133.160.10.1 |
| HOME AGENT | 133.160.10.1 |
| REQUEST IDENTIFIER | 64BITS RANDOM NUMBER |
| EXTENSION | |
| PROTOCOL/PORT NUMBER (TLV) | UDP/5064 |
| PROTOCOL/PORT NUMBER (TLV) | UDP/10000 |

MOBILE COMMUNICATIONS SYSTEM CONFORMING TO MOBILE IP, AND HOME AGENT, MOBILE NODE AND METHOD USED IN THE MOBILE COMMUNICATIONS SYSTEM

BACKGROUND OF THE INVENTION

1. Field of the Invention

The present invention generally relates to a technical field of mobile communications. More particularly, the present invention relates to a mobile communications system conforming to Mobile IP (Mobile Internet Protocol), and relates to a home agent (HA), a mobile node (MN) and a method that are used for the mobile communications system.

2. Description of the Related Art

As hot spot services are appearing, Internet access is becoming available everywhere in towns. The hot spot service is a service for providing an area where wireless accesses can be performed mostly based on a 802.11x wireless LAN standard. In a hot spot, when a mobile node (mobile terminal) of a subscriber of the hot spot service accesses a wireless router, an address that is valid in the wireless LAN segment is issued to the mobile node by DHCP (Dynamic Host Configuration Protocol) so that IP communications can be performed. There are also charge-free hot spot services.

By the way, when the mobile node moves to another hot spot while performing IP communications, the IP address assigned in the previous wireless LAN segment by the DHCP becomes invalid so that any IP packet does not reach the mobile node. Thus, the communication is interrupted.

As a scheme for solving such problem, there is a protocol called Mobile IP. For the Mobile IP, a following document (to be referred to as non-patent document 1) can be referred to, for example.

[Non-patent document 1] Yuuji Fukunaga, "Part. 3 Examine the mechanism of Mobile IP technically", searched on Jun. 22, 2006, (http://www.atmarkit.co.jp/fnetwork/tokusyuu/15mobil eip/mip03.html)

When a process for opening a server port is executed in a mobile node, it is necessary that a home address (HoA) used in a home agent (HA) is a global address. The global address is an address that is uniquely assigned in a wide area network such as the Internet. The global address is distinguished from a care of address that is uniquely assigned only in a particular subnetwork and distinguished from a private address that is uniquely assigned only in an organization and the like. For example, when a mobile node (an IP phone terminal, for example) communicates with another terminal (that can be referred to as CN (Correspondent Node)) using a SIP (Session Initiation Protocol), it is necessary that the mobile node opens a server side RTP port and waits for a connection for performing communications from the correspondent node to the mobile node. In this case, the mobile node needs to have a home address (HoA) that is a global IP address for the correspondent node on the Internet to connect to the server port. Other than the VoIP, when using a game or P2P file exchanging software, the mobile node needs to open the server port so that a global address is necessary as a home address.

FIG. 1 shows a conventional system in which a home address that is a global address is set for each terminal. In this example, a first mobile node MN1 has a first home address HoA1, and a second mobile node MN2 has a second home address HoA2. The home agent manages correspondences between mobile nodes and addresses.

However, the global address is issued by an authorized provider, and certain processes are necessary for obtaining it. In addition, after obtaining the addresses, cost of maintenance is required for the addresses. When global addresses are assigned to each of a plurality of terminals, processes for obtaining addresses and maintenance costs are required for the number of the terminals. Therefore, when many terminals are used by employees in a company or in an organization, the company or the organization needs to prepare global addresses the number of which is the same as the number of the terminals. But, burden for the processes for obtaining the addresses and maintenance costs is not small.

FIG. 2 shows another conventional example. In the example shown in FIG. 2, a home agent is provided in an intra-enterprise network, and the intra-enterprise network is connected to a provider network using a NAT (Network Address Translation) router. A private address uniquely defined in the intra-enterprise network is assigned to each of mobile nodes belonging to the company. Since the private address validly functions only in the company, the private address cannot be used as a global address as it is. The GW/NAT router is a gateway (GW) including a function for converting the private address used in the intra-enterprise network into a global address. Accordingly, irrespective of subnetworks where the mobile node resides, the mobile node can communicate with an external correspondent node by passing through the home agent and the GW/NAT router. Since only one global address is necessary to access the intra-enterprise network in principle, it is not necessary to prepare global addresses the number of which is the same as the number of the terminals as described in the example shown in FIG. 1.

However, according to this method, since private addresses of mobile nodes are managed by the home agent, it is not possible to directly communicate with a correspondent node of a foreign network. More particularly, when the mobile node directly sends a packet to the correspondent node, a private address is set to be a source address of the packet. Thus, the private address is set to be a destination address of a packet sent from the correspondent node to the mobile node (to the home agent), so that the packet cannot reach the mobile node since any route in the Internet cannot be found for the packet. As to a communication from the home agent to the correspondent node, the packet needs to be routed via the gateway. The GW/NAT router derives a global address each time when conversion of a private address is requested by the mobile node side. Thus, in a state in which the request has not been made, the global address cannot be specified. That is, it is not possible that the correspondent node starts to perform a communication with the mobile node.

In addition, according to this method, as to a communication between the mobile node and the home agent, the mobile node needs to establish a tunnel (VPN tunnel) that is a virtual private network from the foreign network to the intra-enterprise network. Therefore, the communication route often results in redundant, and also the overhead becomes large due to encapsulation for VPN and for mobile IP transfer.

In addition, when the gateway converts a packet between the home agent and the correspondent node with NAPT (Network Address Port Translation), it is not possible to support every server process. In a VoIP (Voice over Internet Protocol) communication, a server port to which the correspondent node connects in a RTP session is written into a SIP packet. There is a SIP-NAT that can read out this field to set a NAPT table. However, when server ports included in SIP messages sent by each mobile node are duplicated, only one session can be registered in the NAPT table, so that there may occur a problem in that the other mobile nodes cannot receive a connection from the correspondent node.

A technique related to the above-mentioned method on Mobile IPv4 is described in the following non-patent document 2, and a technique related to the above-mentioned method on Mobile IPv6 is described in the following non-patent document 3.

[Non-patent document 2] IETF (Internet Engineering Task Force), RFC (Request for Comments) 3220, searched on Jun. 22, 2006, (http://www.ietf.org/rfc/rfc3220.txt?number=3220)

[Non-patent document 3] IETF (Internet Engineering Task Force), RFC (Request for Comments) 3775, searched on Jun. 22, 2006, (http://www.ietf.org/rfc/rfc3775.txt?number=3775)

From the viewpoints mentioned above, it is desired to avoid using such redundant route, and it is desired that, even when a plurality of mobile nodes open server ports, a correspondent node can connect to any mobile node. In addition, it is desired to reduce cost for obtaining plural global addresses to cost for obtaining one global address.

SUMMARY OF THE INVENTION

An object of the present invention is that the number of global addresses prepared for a plurality of mobile nodes in a mobile communications system is kept small, and that a communication between a mobile node and a correspondent node can be initiated by either of the mobile node and the correspondent node.

According to one embodiment of the present invention, a mobile communications system conforming to Mobile IP is provided. The mobile communications system includes: a home agent having a global IP address; and a mobile node belonging to the home agent, wherein the global IP address is a home address common to a plurality of mobile nodes.

The home agent includes: an interface unit configured to route a received packet according to a transfer table that includes a correspondence among a home address of the mobile node, a care of address of the mobile node, and a communication session identification number for identifying a communication session opened by an application of the mobile node, wherein a transfer destination of the received packet is identified by a combination of the care of address and the communication session identification number; and a location information management unit configured to manage the transfer table.

The mobile node includes: an interface unit configured to send and receive a packet; and a detection unit configured to detect that one or more of the home address of the mobile node, the care of address of the mobile node and the communication session identification number is changed, wherein the mobile node sends change information detected by the detection unit to the home agent.

According to the embodiment of the present invention, the number of global addresses prepared for a plurality of mobile nodes in a mobile communications system can be kept small, and that a communication between a mobile node and a correspondent node can be initiated by either of the mobile node and the correspondent node.

BRIEF DESCRIPTION OF THE DRAWINGS

Other objects, features and advantages of the present invention will become more apparent from the following detailed description when read in conjunction with the accompanying drawings, in which:

FIG. 9 shows examples of information items included in a location information registration request message;
FIG. 10 shows examples of flags;
FIG. 11 shows examples of information items included in a location information registration response message;
FIG. 12 shows an example of a terminal information table managed by the SIP server;
FIG. 13 shows an example of a packet transfer table;
FIG. 14 shows an example of an updated packet transfer table;
FIG. 15 shows examples of information items included in a location information registration response message (when updating);
FIG. 16 shows a port management table referred to by a mobile node;
FIG. 17 shows an updated packet transfer table;
FIG. 18 shows examples of information items included in a location information registration response message (when terminating).

DETAILED DESCRIPTION OF THE PREFERRED EMBODIMENTS

In the following, embodiments of the present invention are described with reference to figures.

According to one embodiment of the present invention, a new packet data transfer apparatus to which a home agent function is added is used as a gateway in an intra-enterprise network. The packet data transfer apparatus is called a home agent gateway (GW/HA). A global IP address already obtained by the home agent gateway is treated as a home address (HoA) common to a plurality of mobile nodes, and each communication session with an mobile node is identified by a port number used by an application in the mobile node. When the home agent gateway receives a packet from a correspondent node, the home agent gateway specifies a port number of a socket opened in an application of a mobile node so as to transfer the packet to the mobile node corresponding to the port number. Accordingly, a global IP address can be shared by a plurality of mobile nodes so that home address obtaining cost can be kept low.

First Embodiment

Figure 1:
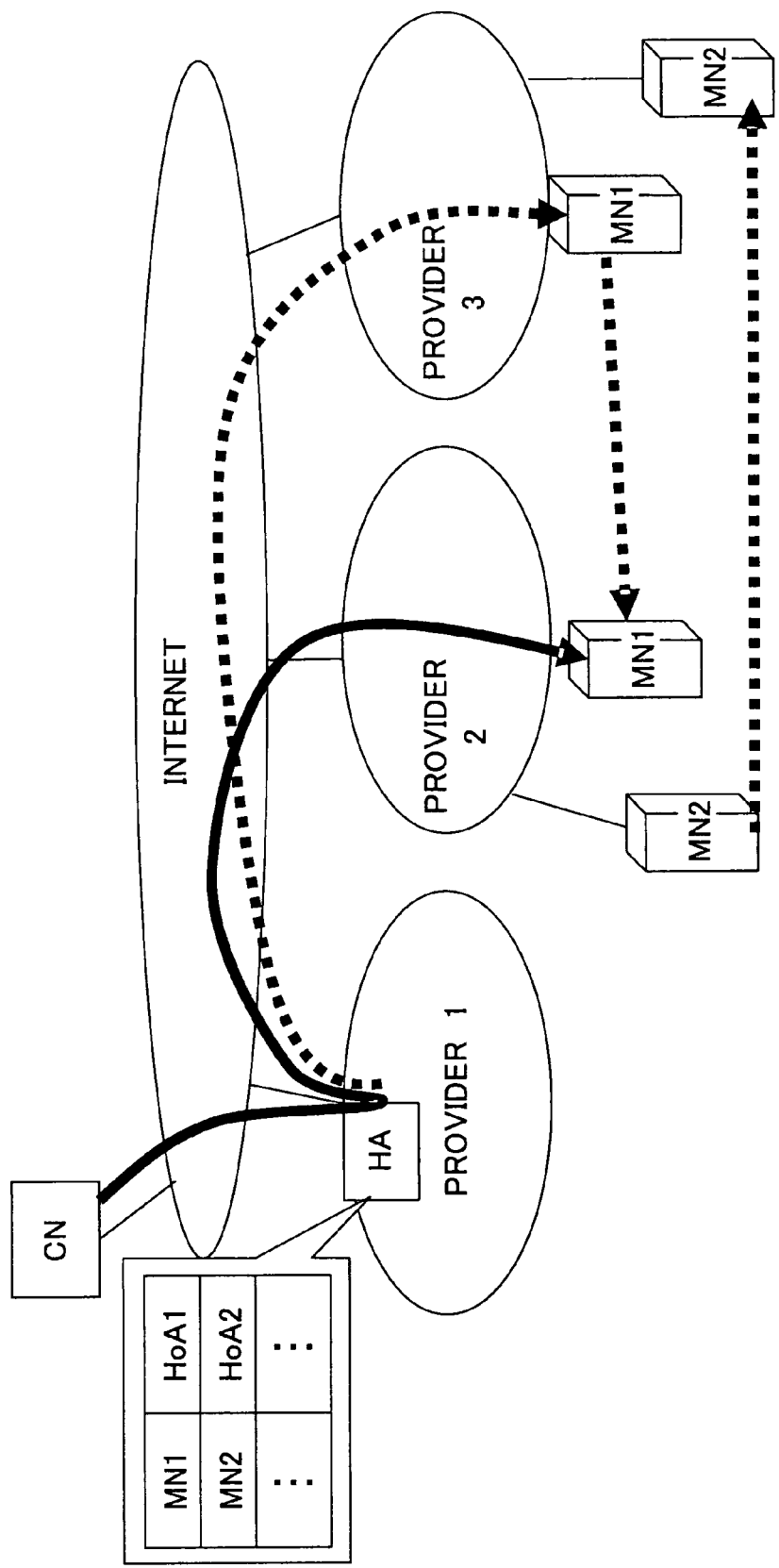
FIG. 1 shows a conventional system (1)
Figure 2:
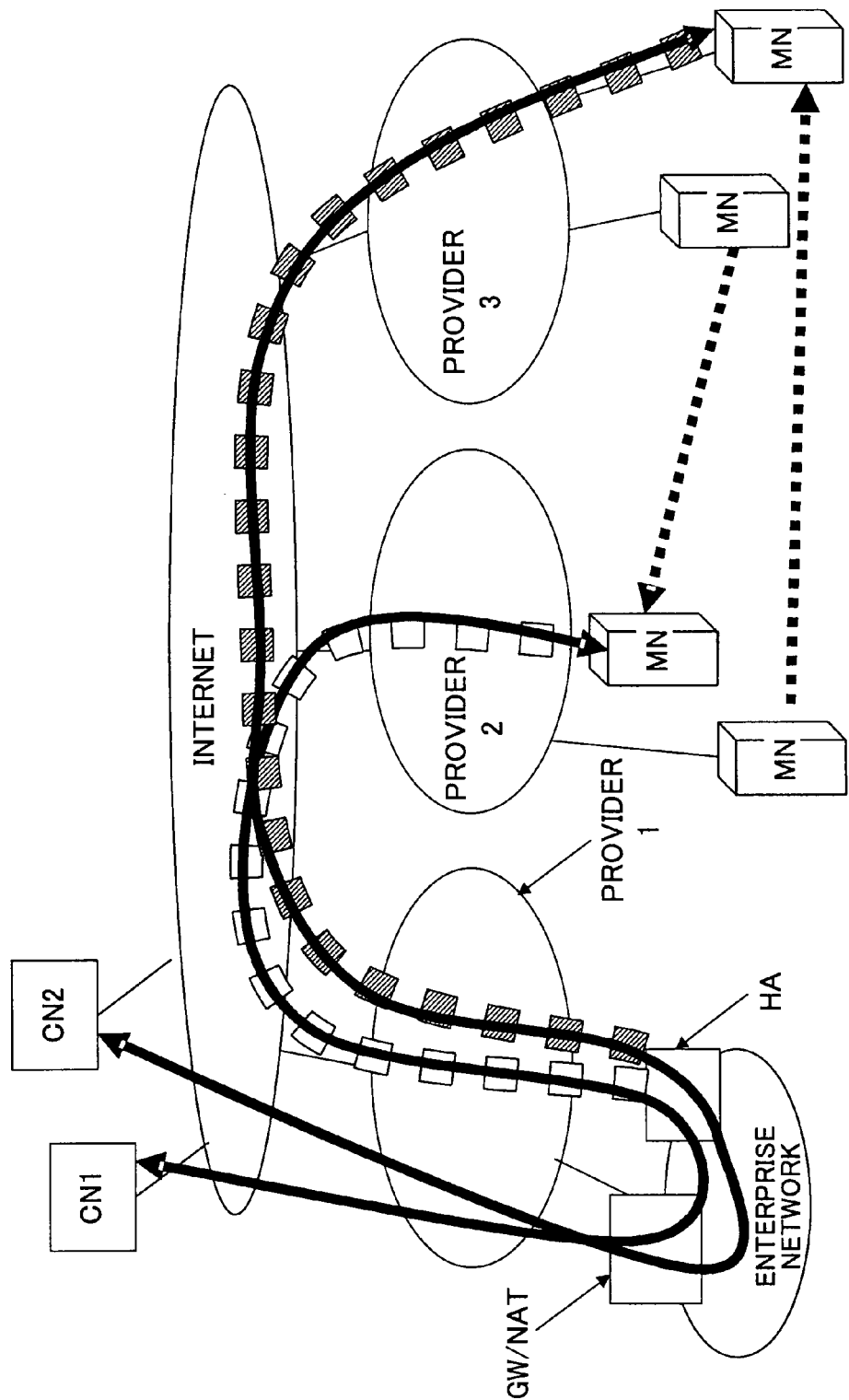
FIG. 2 shows a conventional system (2)
Figure 3:
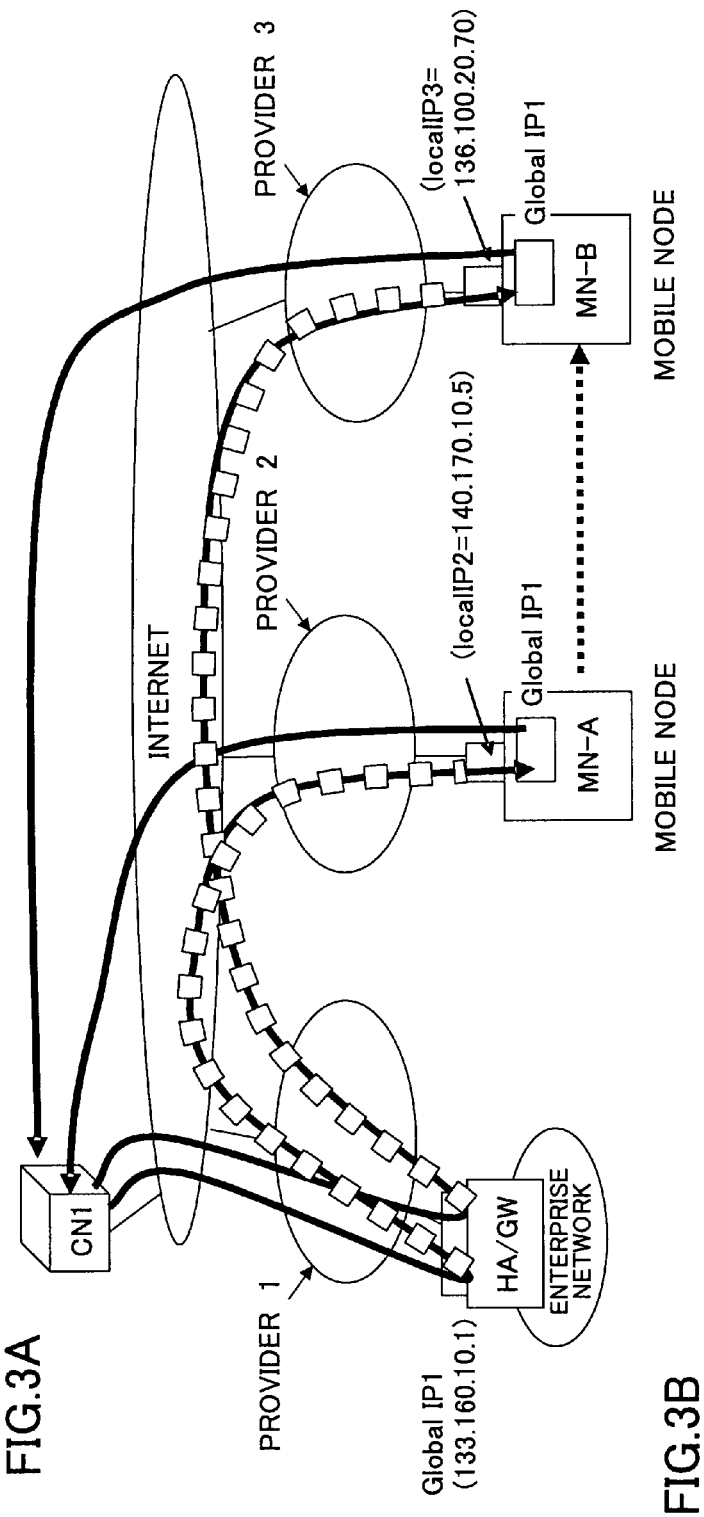
FIG. 3A shows a mobile IP system of a first embodiment of the present invention.
FIG. 3B shows a packet transfer table.

FIG. 3A shows a system of an embodiment of the present invention. This system is a mobile communications system conforming to Mobile IP. This system includes the Internet, subnetworks (provider networks 1, 2 and 3) connected to the Internet, a home agent gateway (GW/HA), mobile nodes NM-A and MN-B and an external correspondent node (CN). The correspondent node CN may be a mobile terminal or a fixed terminal. When the correspondent node CN is a mobile terminal, it is desirable that the correspondent node CN includes functions of mobile nodes described in this embodiment, wherein the functions include a function for identifying a mobile nodes using a port number, for example, as described in the following description.

Each provider network includes a different network address. The network address of the provider 1 is 130.160.0.0/16, the network address of the provider 2 is 140.170.0.0/16, and the network address of the provider 3 is 136.100.0.0/16. Each provider issues a global IP address (CoA: Care Of Address) to each mobile node. In the example shown in the figure, the provider 2 assigns an address IP2 that is 140.170.10.5 to the mobile node MN-A. The provider 3 assigns an address IP3 that is 136.100.20.70 to the mobile node MN-B. In addition, the provider networks can communicate with each other via the Internet.

For the sake of simplicity, addresses conforming to IPv4 are used. But, addresses conforming to any protocol such as IPv6 can be used.

An intra-enterprise network of a company that is a customer of the provider 1 is connected to the provider network 1 via the home agent gateway (HA/GW). This company lends mobile nodes to the employees so that the employees can use mobile nodes (MN-A and MN-B in this example) outside the company. In other words, the mobile nodes MN-A and MN-B belong to the home network that is the intra-enterprise network. FIG. 3B shows a packet transfer table included in the home agent gateway (HA/GW) that is described in the following.

Figure 4:
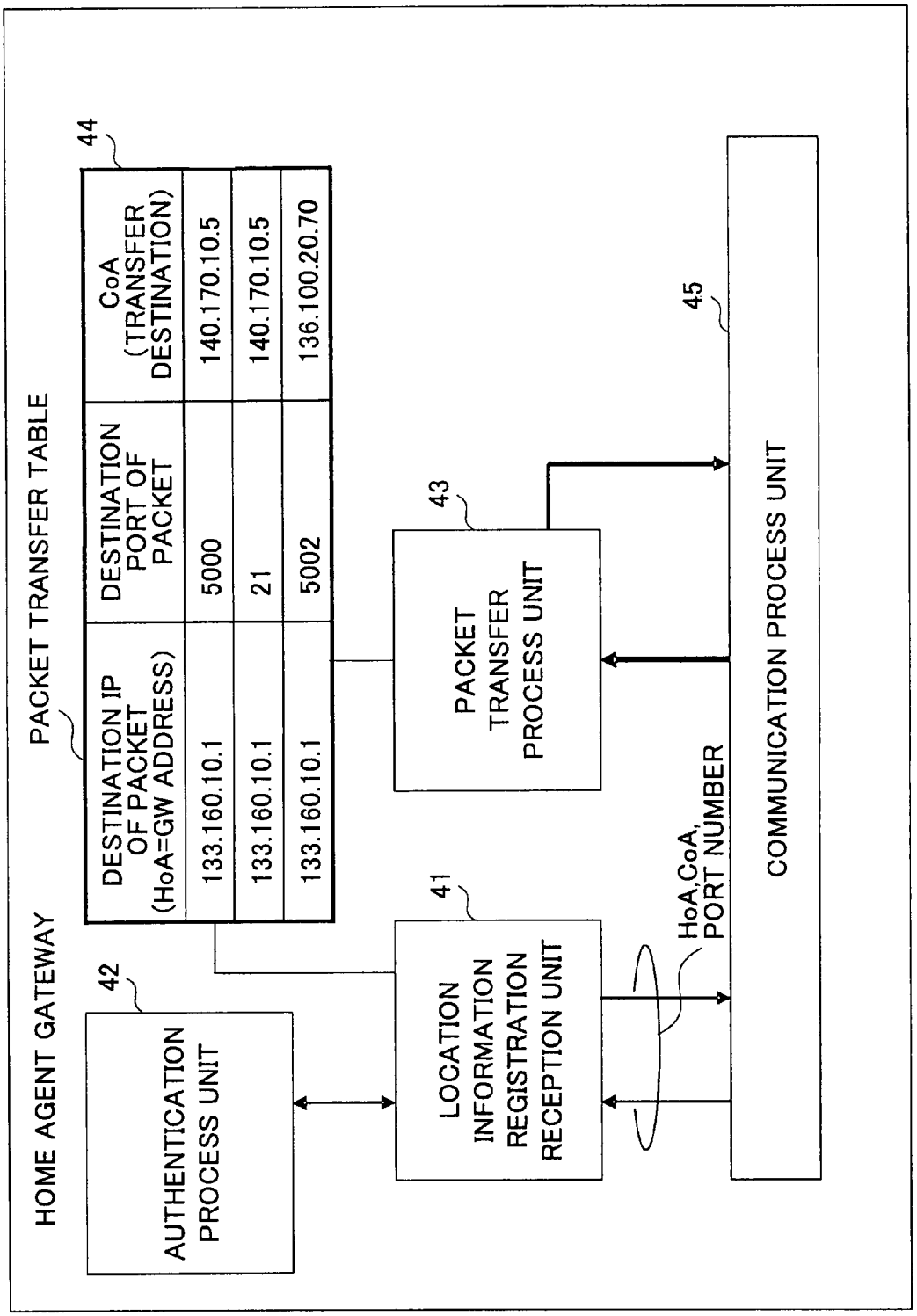
FIG. 4 shows a functional block diagram of a home agent gateway.

FIG. 4 shows a functional block diagram of the home agent gateway. The home agent gateway includes a location information registration reception unit 41, an authentication process unit 42, a packet transfer process unit 43, a packet transfer table 44 and a communication process unit 45.

When a mobile node moves or when a mobile node launches a new application, the location information registration reception unit 41 registers a port number of the application and a care of address (CoA) of the mobile node into the packet transfer table 44. In addition, the location information registration reception unit 41 has a function, when the home address is changed, for registering a changed home address. By the way, since the home address of the home agent gateway is seldom changed, it can be considered that this function is rarely executed.

For example, when the home address is changed, the home agent gateway updates the packet transfer table 44 before sending an updated home address to the mobile node. In addition, for example, when the home address is changed, the home agent gateway may update the packet transfer table 44 after sending a changed home address to the mobile node and receiving information indicating that the home address is changed from the mobile node.

The authentication process unit 42 authenticates or checks whether a location information registration request is sent from a valid mobile terminal.

As to a packet received from a correspondent node, the packet transfer process unit 43 encapsulates the packet and transfers it to a mobile node indicated by CoA when the destination of the received packet is registered in the packet transfer table.

The packet transfer table 44 is a table for storing correspondences among the home address, port numbers of applications launched in mobile nodes, and care of addresses in networks where the mobile nodes reside. A packet received by the home agent is transferred to a mobile node (application of the mobile node) identified by a combination of a care of address and a port number. This table is set and updated according to a trigger from the location information registration reception unit 41, and is referred to by the packet transfer process unit 43 when transferring a packet.

The communication process unit 45 includes a function as an interface for sending and receiving a packet.

Figure 5:
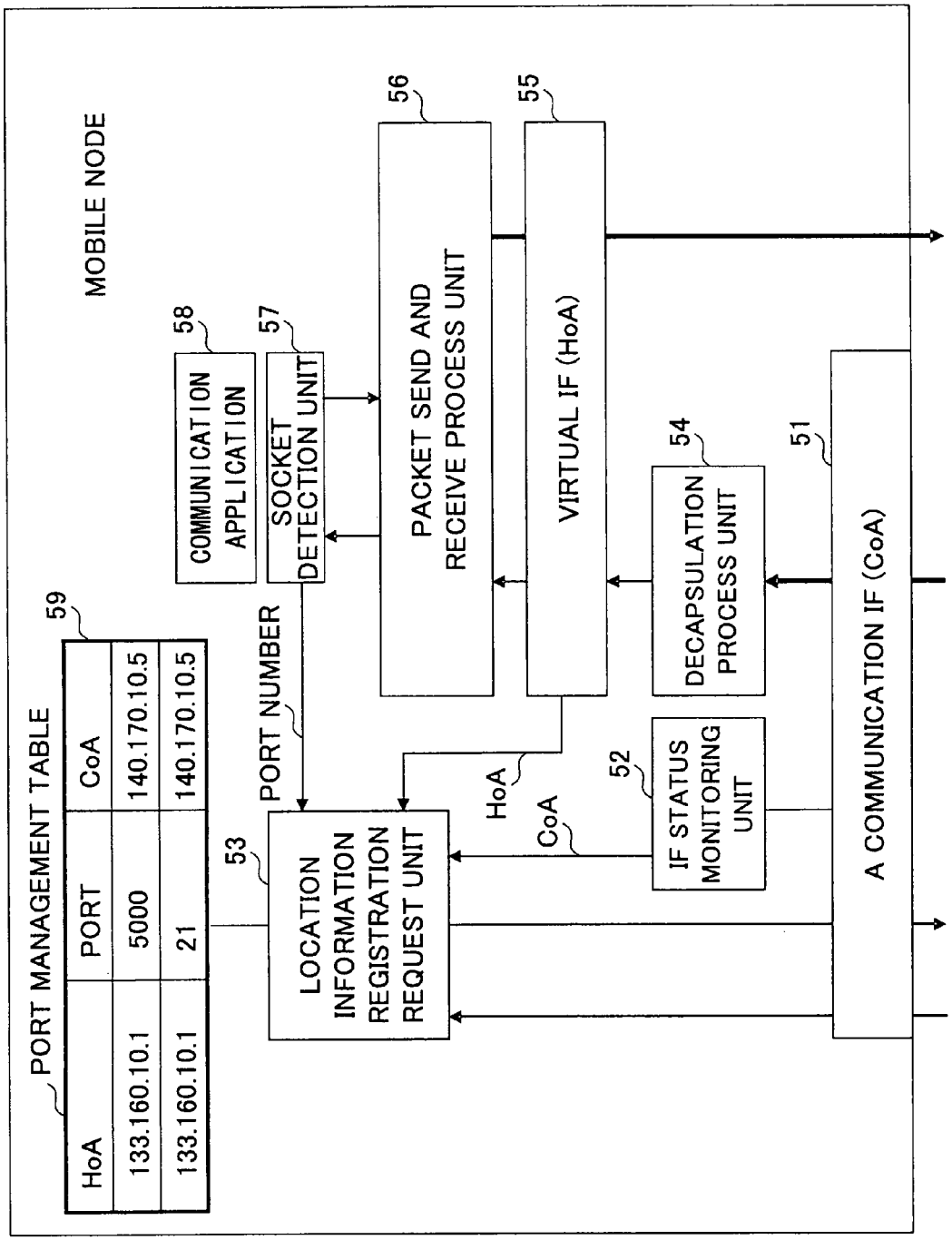
FIG. 5 shows a functional block diagram of a mobile node.

FIG. 5 shows a functional block diagram of a mobile node of an embodiment of the present invention. The mobile node includes a communication interface (IF) 51, an IF status monitoring unit 52, a location information registration request unit 53, a decapsulation process unit 54, a virtual IF 55, a packet send and receive process unit 56, a socket detection unit 57, a communication application 58 and a port management table 59.

The communication IF 51 is an interface of IP layer. An IP address assigned in the network to which the mobile node is currently connecting is one set in the IP layer. In the example shown in the figure, 140.170.10.5 is set as the IP address (CoA).

The IF status monitoring unit 52 includes a function for monitoring a send and receive status (UP/DOWN status) of the communication IF and a function for monitoring whether the IP address (CoA) is changed. When the IF status monitoring unit 52 detects that the IP address (CoA) of the communication IF is changed, change information is sent to the location information registration request unit 53.

The decapsulation process unit 54 decapsulates a packet transferred from the home agent and the mobile node via an IPinIP tunnel, and sends the IP packet decapsulated from the packet to the virtual IF. A foreign agent function of Mobile IP is included in the decapsulation process unit.

The virtual IF 55 is an interface having the home address of the mobile node. The interface receives the IP packet in the encapsulated IP packet transferred via the IPinIP tunnel from the home agent to the mobile node. The virtual IF 55 holds an address (133.160.10.1) of an IF at which the home agent gateway connects to the provider.

When a communication application launches, the socket detection unit 57 detects a system call for generating a communication socket and setting a port number in the socket. The socket detection unit 57 detects a port number used in the application 58 that operates in the mobile node, and reports the port number to the location information registration request unit 53. Which port number is to be used may be determined by the application 58 or may be determined by the home agent. In this embodiment, since a mobile node (application operating in the mobile node, more strictly) is identified by a port number, a same port number should not be used in a plurality of mobile nodes. At least, a same port number should not be used in mobile nodes residing in a same subnetwork. In view of effectively avoiding use of overlapping port numbers, it is desirable that the port number is determined and issued by the home agent (by the location information registration reception unit 41 or an entity having other control function, for example).

By the way, as to the port number, the home agent gateway may include an arbitration unit for designating a port number so as to avoid that the port number is used by a plurality of mobile nodes. In addition, when there are competing demands by more than one mobile node for a port number, the home agent gateway may determine and issue different port numbers to mobile nodes so as to avoid the competition.

In addition, as to the port number, in a case when the mobile node does not designate a port number in a location information registration request, the home agent gateway may issue a not-used port number to the mobile node. Further, in a case where a plurality of global IP addresses are provided in the mobile communications system wherein each of the plurality of global IP addresses is a home address common to a plurality of mobile nodes, packet transfer tables each corresponding to one of the home addresses are managed in the home agent gateway side, and when a port number is overlapped among a plurality of mobile nodes, the overlapped port number can be registered in each of the packet transfer tables so that overlapping of a port number among a plurality of mobile nodes can be allowed.

When the location information registration request unit 53 receives notification from the IF status monitoring unit 52 or the socket detection unit 57, the location information registration request unit 53 requests the home agent gateway to register (including new registration and update) location information. When the location information registration request unit 53 receives notification of change of the IP address (CoA) from the IP status monitoring unit 52, the location information registration request unit 53 sends a request message to change a correspondence, currently registered in the home agent gateway, between the port number of the application and CoA. When receiving a new port number from the socket detection unit 57, the location information registration request unit 53 sends a request message to change a correspondence between the port number of the application and CoA to the home agent gateway.

The packet send and receive process unit 56 includes a function for performing protocol processing such as TCP/IP on an IP packet received from the virtual IF 55 and passing the processed data to the application via a socket. The packet send and receive process unit 56 further include a function for sending data from the application as an IP packet using IF. In Mobile IP, there is a scheme for directly sending a packet from the virtual IF to a correspondent node via a currently connecting network, and a scheme (IETF RFC 2344) for encapsulating the packet from the virtual IF and sending the encapsulated packet via the home agent. In this embodiment, the former scheme is considered.

The port management table 59 stores correspondences among the home address, port numbers and the care of address (CoA) of the own node. It is necessary that the table 59 includes information the same as information relating to the mobile node in the packet transfer table 44 in the home agent gateway. In the packet transfer table shown in FIGS. 3B and 4, each of two lines corresponding to port numbers 5000 and 21 respectively relates to the mobile node MN-A, and a line corresponding to the port number 5002 relates to the mobile node MN-B.

In this embodiment, following four procedures are executed in general.

(1) Setting Procedure

Each of the mobile nodes has a home address (an address of the home agent gateway) as an address of a virtual interface (IF) of the mobile node. The home address is a global address, and is shared by a plurality of mobile nodes. In the example shown in FIG. 3A, 133.160.10.1 is shared by the mobile nodes MN-A and MN-B. In addition, each mobile node is assigned a care of address (CoA) that is effective at least in the network (visited subnetwork) to which the mobile node is currently connecting. In the example of the figure, the mobile node MN-A is assigned 140.170.10.5, and the mobile node MN-B is assigned 136.100.20.70.

(2) Location Information Registration

The socket detection unit (can be called a port number detection unit) 57 of the mobile node shown in FIG. 5 detects that an application in the mobile node tries to set a port identification number in a communication port (socket). The detection result is reported to the location information registration request unit 53. The location information registration request unit 53 reports correspondences among the home address, the port identification number and the address for communication (CoA) to the location information registration reception unit 41 in the home agent shown in FIG. 4. The home agent receives the reported information with the location information registration reception unit 41, and reflects the correspondences onto the packet transfer table 44.

(3) Data Sending and Receiving

When the home agent receives a packet addressed to the home address of the home agent from a correspondent node, the home agent refers to the packet transfer table 44. When there is an entry corresponding to the packet, the home agent encapsulates the packet and transfers the encapsulated packet to the care of address (CoA) corresponding to the packet. When the mobile node receives the encapsulated packet addressed to the CoA from the home agent, the mobile node decapsulates it and receives the decapsulated packet with the virtual IF, and passes the packet to an application identified by the port identification number included in the packet.

As to a packet that the mobile node sends to a correspondent node, the packet does not pass through the home agent and is transferred to the correspondent node via a router of the provider to which the mobile node connects.

(4) Movement of Mobile Node

The IF status monitoring unit 52 of the mobile node shown in FIG. 5 detects that the mobile node moves to another network so that a new address for communication (CoA) is set. The detected information is reported to the location information registration request unit 53. The location information registration request unit 53 reports correspondences among the home address, the port identification number and the new address (CoA) to the home agent. The home agent shown in FIG. 4 receives the reported information with the location information registration reception unit 41 and reflects the correspondence information onto the packet transfer table 44.

According to the above-mentioned operation, cost for enabling a plurality of mobile nodes to perform mobile communications can be kept low almost without restricting operation of the application. More particularly, cost for obtaining global addresses which was for the number of mobile nodes can be reduced since one address is shared by a plurality of terminals. In addition, the external correspondent terminal can easily communicate with the mobile node by specifying a home address and a port number.

As the port number, a port number that is found by any means can be used. For example, a port number found by another protocol can be used like the second embodiment described later. Alternatively, a port number that is commonly used in this technical field as a well known port can be used. Anyway, it is only necessary that a concerned node that performs communication is identified from another node.

Second Embodiment

Figure 6:
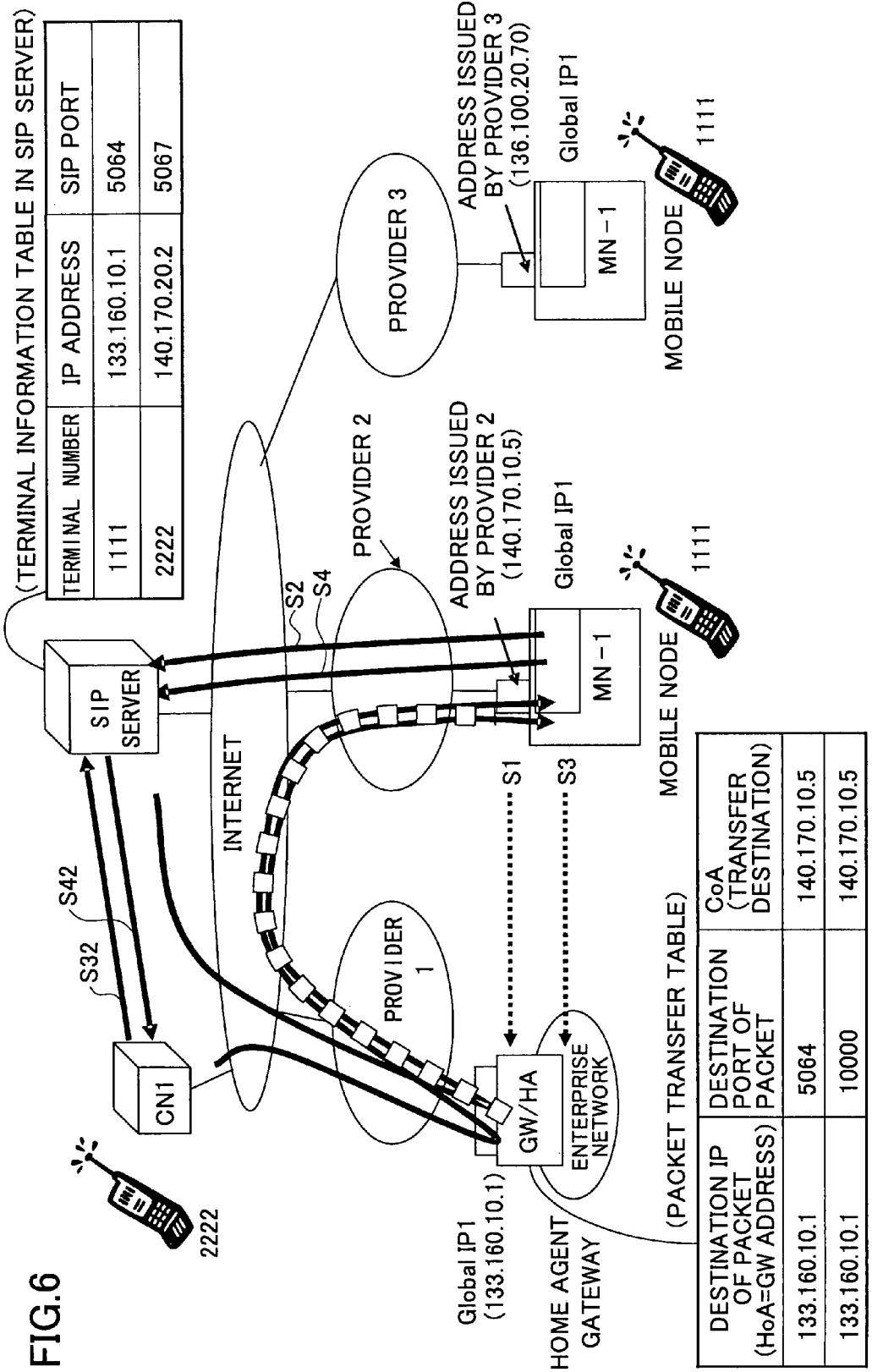
FIG. 6 shows a mobile IP system of a second embodiment of the present invention.

FIG. 6 shows a system of the second embodiment of the present invention, and shows a packet transfer table and a terminal information table in this embodiment. In the system a SIP server is added to components shown in FIG. 3A.

An intra-enterprise network of a company that is a customer of the provider 1 is connected to the provider network 1 via the home agent gateway (HA/GW). This company lends mobile nodes to the employees so that the employees can use mobile nodes (MN-A and MN-B in this example) outside the company. Each mobile node includes an IP telephone function. The SIP server is provided by the provider and is located on the Internet (or on the provider network). The SIP server registers addresses and telephone numbers (terminal numbers) and the like of mobile nodes so as to transfer an incoming call request from a node to another node.

By registering the information of a mobile node into the SIP server, the mobile node can perform voice packet communications with another terminal CN1 or CN2 on the Internet. In this example, terminal numbers and addresses of MN1, MN2, CN1 and CN2 are registered in the SIP server. In the following, a case where a terminal CN1 makes a call to the mobile node MN1 based on VoIP is described.

Figure 7:
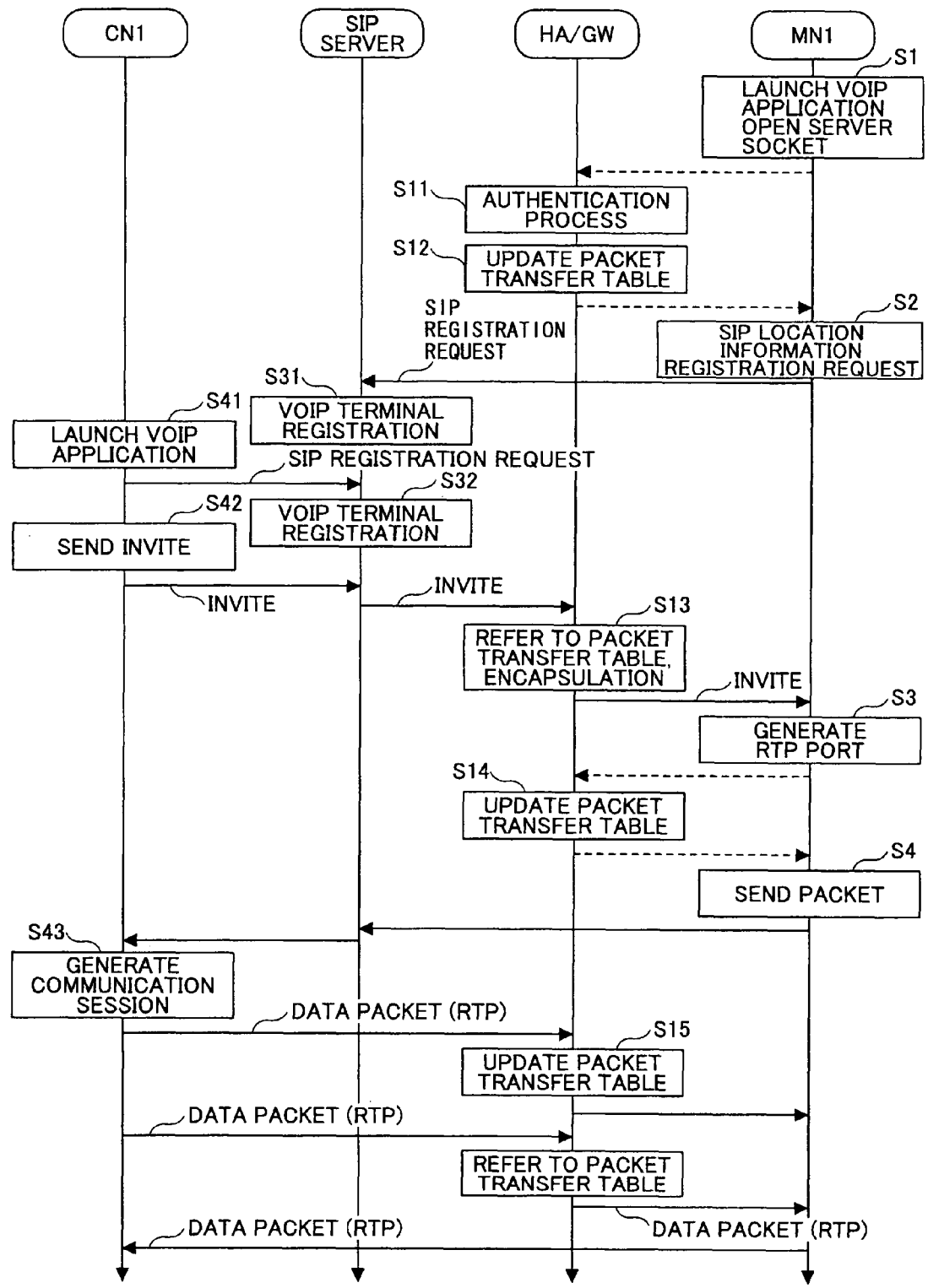
FIGS. 7 and 8 are flowcharts for explaining operation in the second embodiment.
Figure 8:
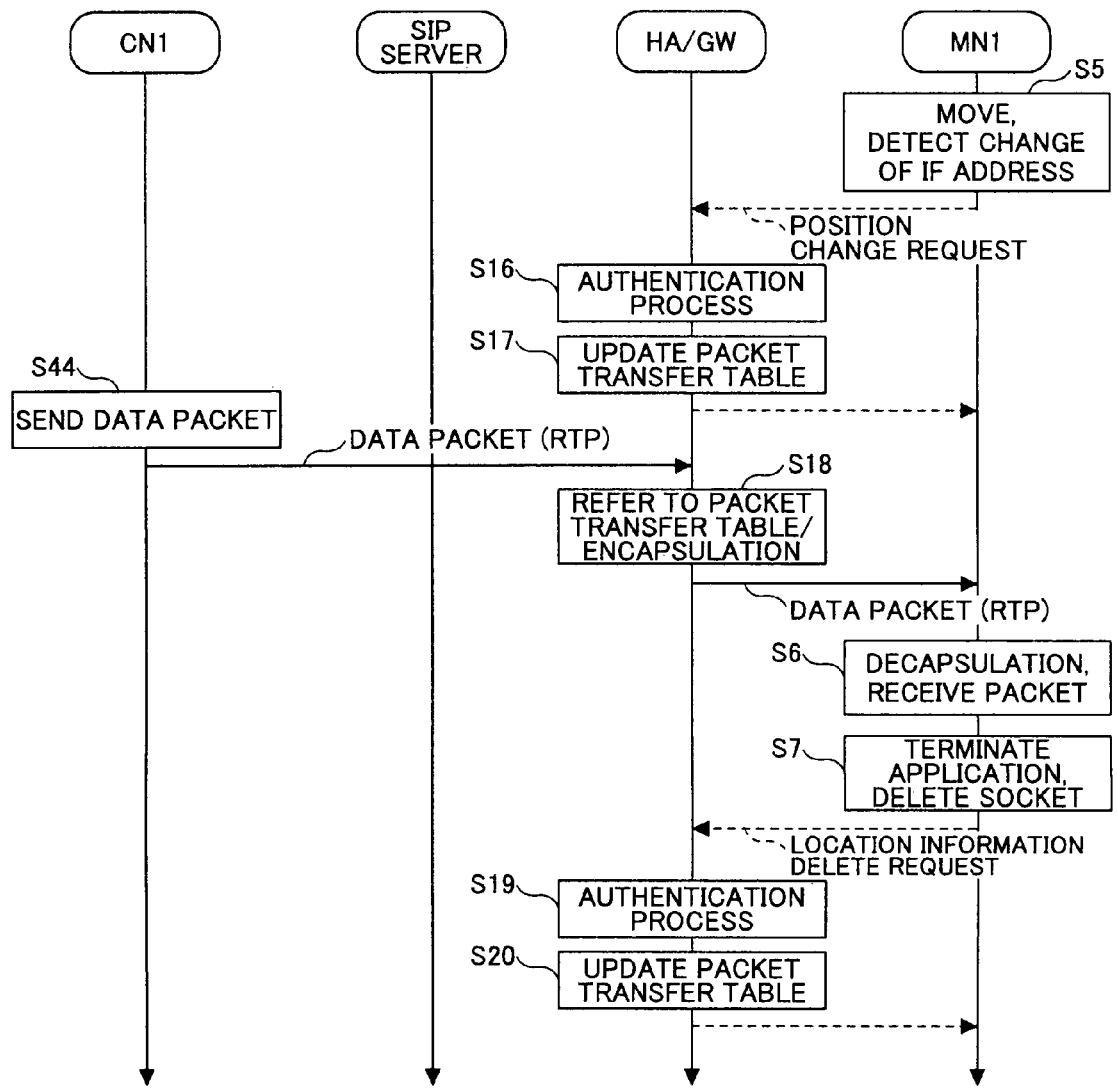

Operation of this embodiment is described with reference to FIGS. 7 and 8. For convenience sake, following four phases are described: A. Location registration phase, B. Data send and receive phase, C. Mobile node movement detection phase, and D. Application terminating phase.

[A. Location Information Registration Phase]

A mobile node user sets an address (133.160.10.1) of the home agent gateway in the mobile node (MN1) as a home address. This address setting can be performed anytime before starting VoIP communications. For example, the setting may be performed beforehand independently of VoIP communications, or the home address may be automatically obtained from the home agent when turning on the mobile node or when launching an application. In this embodiment, it is assumed that the address has been set.

In step S1, the mobile node user launches a VoIP application for performing voice packet communications. Generally, an application generates two kinds of sockets for waiting (server sockets). One is a SIP port for receiving an incoming call from another VoIP terminal in which 5064 is set as the port number. Another one is a socket for waiting for an RTP session in which 10000 is designated as the port number. In this phase, the SIP port is generated first. Generally, when generating a communication socket, the application issues system calls (socket system call and bind system call) to the OS.

When the bind system call is issued, the socket detection unit sends a location information registration request message that is described below to the home agent gateway (HW/GW). Then, the mobile node MN1 waits for a location information registration response message.

FIG. 9 shows information items included in the location information registration request message. FIG. 10 shows examples of flags. In this example, since the communication application requests port number: 5064 for UDP, 5064 is designated as a port number in the message. A value "registration" indicating a registration request is designated in Type field, "133.160.10.1" that is the same address of the HA/GW is designated as a home address, and "133.160.10.1" is designated as an address of the home agent.

In step S11, when the home agent gateway receives the location information registration request message from the mobile node, the home agent gateway authenticates the message using the authentication process unit. When it is authenticated, the home agent gateway searches the packet transfer table to check whether a port number that the mobile node tries to use is already registered as a destination port for the home address (HoA).

In step S12, when it is not already registered, the home agent gateway newly registers a correspondence among the home address, the port number and the care of address in the packet transfer table, and returns the location information registration response message (result code 0; registration succeeds) to the mobile node MN1. When the port number is already registered in the packet transfer table, the home agent gateway returns a location information registration response message (result code 128; registration fails) to the mobile node MN1.

FIG. 11 shows examples of information items included in the location information registration response message.

The mobile node MN1 receives the location information registration response message indicating that registration succeeds, the mobile node MN1 returns a response (succeed) for the system call to the application in the mobile node MN1. When the location information registration response indicating that the registration succeeds is not obtained or when the result code indicates that registration fails, the mobile node returns a response (fail) for the system call to the application. The application that receives failure information for the bind system call retries setting of a port number using another number.

From the viewpoint for keeping the packet transfer table to be up-to-date, it is desirable that the mobile node MN1 periodically or irregularly sends the location information registration request message to the home agent gateway even after receiving the location information registration response message indicating that registration succeeds.

[B. Data Send and Receive Phase]

In this embodiment, a system including the home agent gateway and the mobile node is described. In addition, a using method of a VoIP system including the system is described. In terms of the system including the home agent gateway and the mobile node, operation of the VoIP protocol can be positioned to be data sending and receiving. Thus, the operation of the VoIP protocol is described in this phase. For avoiding confusion, sequences by the VoIP protocol are shown using solid lines and other communications for control information are shown using dotted lines.

In step S2, the mobile node MN1 sends a SIP registration request message to the SIP server. The SIP registration request message includes a VoIP telephone number (1111), an IP address (home address), and a receiving port number (5064) of the mobile node MN1.

In step S31, the SIP server registers information in the SIP registration request message into a terminal information table. Also, a terminal that is a correspondent node registers the similar information into the SIP server (S41, S32).

FIG. 12 shows a terminal information table managed by the SIP server.

Next, a case in which the correspondent node CN1 having a terminal number 2222 calls the mobile node MN1 having the terminal number 1111 is described. The correspondent node CN1 sends an INVITE message including the terminal number of the mobile node MN1 that is a call destination to the SIP server. The SIP server refers to the terminal information table and transfers the INVITE message to the home agent gateway. The INVITE message is a UDP packet and is sent to a destination identified by the IP address: 133.160.10.1 and the UDP port number: 5064.

In step S13, when the home agent gateway receives the INVITE message, the home agent gateway refers to the packet transfer table. When it founds a corresponding entry, the home agent gateway encapsulates the packet by IPinIP and sends the encapsulated packet to a corresponding care of address.

FIG. 13 shows an example of the packet transfer table. In this example, an information item of the first line is referred to, so that the home agent gateway encapsulates a packet including the INVITE message and sends the encapsulated packet to 140.170.10.5.

In step S3, when the mobile node MN1 receives the encapsulated packet from the communication IF (140.170.10.5), the mobile node MN1 decapsulates the packet using the decapsulation process unit, so that the virtual IF (133.160.10.1) receives the INVITE message decapsulated from the encapsulated packet, and the message is passed to the communication application. When the communication application receives the INVITE message, the communication application generates a socket for an RTP session for performing a communication. At this time, location information registration request/response messages are exchanged like in the location information registration phase, so that the home agent and gateway registers a server port (10000 in this example) of RTP (in step S14). After the RTP port is opened, the packet transfer table is managed and updated as shown in FIG. 14.

When registration of the RTP port succeeds so that the system call for generating the server socket succeeds, the communication application sends an INVITE response message for the INVITE message to the SIP server (last sending source of the INVITE message). The SIP server sends this message to the correspondent node CN1. The INVITE response message includes a receive port number by which the mobile node MN1 receives the RTP session.

In step S43, the correspondent node CN1 starts a call session so as to send voice packets to the mobile node MN1. The voice packets are sent to a destination identified by the IP address: 133.160.10.1 and the UDP port number: 10000. As a result, the packets reach the home agent gateway without passing through the SIP server.

As shown in step S15, when the home agent gateway receives the voice packet, the home agent gateway refers to the packet transfer table shown in FIG. 14. In this example, since an entry of the second line corresponds to the voice packet, the home agent gateway encapsulates the packet and sends the encapsulated packet to a corresponding care of address: 140.170.10.5.

When the mobile node MN1 receives the encapsulated packet with the communication IF (140.170.10.5), the mobile node MN1 decapsulates the packet so that the virtual IF (133.160.10.1) receives the decapsulated packet, and the message is passed to the socket of the port number 10000 of the communication application. Accordingly, voice can be received. In addition, the mobile node MN1 sends a packet to the RTP port in the correspondent node CN1 side included in the INVITE message. This packet is transferred to the correspondent node CN1 via a router of the provider 2 to which the mobile node MN1 connects without passing though the home agent gateway. Accordingly, voice conversation based on VoIP becomes available.

After that, communication of the voice packets is performed based on a triangular route formed by CN1-HA-MN1-CN1.

[C. Mobile Node Movement Detection Phase]

Next, an operation example is described for a case when the mobile node MN1 moves from a network of the provider 2 to a network of the provider 3 while performing the call.

In step S5, the IF status monitoring unit 52 in the mobile node MN1 shown in FIG. 5 detects that the IP address of the communication IF is changed due to change of the residing network. Then, the IF status monitoring unit 52 reports the changed information to the location information registration request unit 53. As shown in FIG. 6, the care of address (CoA) is changed from "140.170.10.5" to "136.100.20.70". The location information registration request unit 53 refers to the port management table shown in FIG. 16 so as to send a location information registration request message for updating the correspondence between the port number and the CoA for an entry in which CoA is an old IP address. More particularly, since CoA=140.170.10.5 (old address) is associated with the port numbers 5064 and 10000, the location information registration request message is sent after CoA is changed such that CoA=136.100.20.70 is associated with the port numbers 5064 and 10000. At this time, as shown in FIG. 15, a plurality of port numbers can be sent by connecting them to the message as TLVs.

In step S16, when the home agent gateway receives the location information registration request message, the home agent gateway performs authentication for authenticating validity of communication.

In step S17, a corresponding entry in the packet transfer table is updated, and a location information registration response message is returned. FIG. 17 shows an updated packet transfer table.

As shown step S18, when the home agent gateway receives the packet from the correspondent node CN1, the home agent gateway transfers the packet according to the updated packet transfer table. In this case, when the home agent gateway receives a packet from the correspondent node CN1, the home agent gateway encapsulates the packet and sends the encapsulated packet to 136.100.20.70 that is a CoA based on an entry in the second line shown in FIG. 17. Accordingly, the mobile node MN1 can properly receives packets addressed to the home address HoA also in the new network (in step S6).

[D. Application Terminating Phase]

Finally, a procedure for the mobile node MN1 to terminate the communication application is described.

In step S7, when the application terminates in the mobile node MN1, the opened socket is closed. The socket detection unit 57 in the mobile node MN1 reports to the location information registration request unit 53 that the socket is deleted and the port number is not used. The location information registration request unit 53 sends a location information registration request message (delete=effective registration term is set to be 0) for deleting a corresponding port to the home agent gateway as shown in FIG. 18.

As shown in steps S19 and S20, after authenticating the received packet, the home agent gateway updates the table by deleting the corresponding entry from the packet transfer table, and sends a location information registration response message to the mobile node MN1.

By the way, as to update of the packet transfer table when terminating the application, it is not essential that the mobile node MN1 sends the location information registration request message. For example, the home agent may determine that the application in a mobile node is terminated for some reason based on one or more determination criteria. One criteria is that any entry in the packet transfer table is not referred to for a predetermined time, and another criteria is that an update request is not received from the mobile node for a predetermined time. After determining that the application is terminated, the home agent gateway deletes the timeout entry to update the packet transfer table.

As to the above-mentioned embodiments, plural embodiments can be combined as necessary.

The present invention is not limited to the specifically disclosed embodiments, and variations and modifications may be made without departing from the scope of the present invention.

The present application contains subject matter related to Japanese patent application No. 2006-242830, filed in the JPO on Sep. 7, 2006, the entire contents of which are incorporated herein by reference.

What is claimed is:

1. A mobile communications system conforming to Mobile IP comprising:
    a home agent having a global IP address; and
    a mobile node belonging to the home agent, wherein the global IP address is a home address common to a plurality of mobile nodes,
    the home agent comprising:
        an interface unit configured to route a received packet according to a transfer table that includes a correspondence among a home address of the mobile node, a care of address of the mobile node, and a communication session identification number for identifying a communication session opened by an application of the mobile node, with respect to each of the plurality of mobile nodes, wherein a transfer destination of the received packet is identified by a combination of the care of address and the communication session identification number; and
        a location information management unit configured to manage the transfer table,
    the mobile node comprising:
        an interface unit configured to send and receive a packet; and
        a detection unit configured to detect a change in at least one of the home address of the mobile node, the care of address of the mobile node and the communication session identification number, wherein the mobile node sends change information indicating the change detected by the detection unit to the home agent when the application generates a communication socket.

2. A home agent used in a mobile communications system conforming to Mobile IP, wherein a mobile node belongs to the home agent, and the home agent has a global IP address that is a home address common to a plurality of mobile nodes, the home agent comprising:
    an interface unit configured to route a received packet according to a transfer table that includes a correspondence among a home address of the mobile node, a care of address of the mobile node, and a communication session identification number for identifying a communication session opened by an application of the mobile node, with respect to each of the plurality of mobile nodes, wherein a transfer destination of the received packet is identified by a combination of the care of address and the communication session identification number; and
    a location information management unit configured to manage the transfer table,
    wherein the transfer table is updated based on change information from the mobile node indicating that at least of the home address of the mobile node, the care of address of the mobile node and the communication session identification number is changed.

3. The home agent as claimed in claim 2, further comprising an arbitration unit configured to designate a communication session identification number so as to avoid that the communication session identification number is used by a plurality of mobile nodes.

4. The home agent as claimed in claim 3, wherein, when there are competing demands by more than one mobile node for a communication session identification number, the home agent designates communication session identification numbers so as to avoid the competition.

5. The home agent as claimed in claim 3, wherein, when the mobile node does not designate a communication session identification number used by the mobile node, the home agent issues an uncompetitive communication session identification number to the mobile node.

6. The home agent as claimed in claim 2, wherein
    a plurality of global IP addresses are provided wherein each of the plurality of global IP addresses is a home address common to the plurality of mobile nodes, and transfer tables each corresponding to one of the global IP addresses are provided, and
    when a communication session identification number overlaps among mobile nodes, the communication session identification number is registered in different transfer tables from one which is already registered so that overlapping of the communication session identification number is allowed.

7. The home agent as claimed in claim 2, wherein the home agent detects that the mobile node is launched and sends the home address to the mobile node.

8. The home agent as claimed in claim 2, wherein, when the home address is changed, the home agent updates the transfer table before sending an updated home address to the mobile node.

9. The home agent as claimed in claim 2, wherein, when the home address is changed, the home agent updates the transfer table after sending a changed home address to the mobile node and receiving information indicating that the home address is changed from the mobile node.

10. A mobile node used in a mobile communications system conforming to Mobile IP, wherein the mobile node belongs to a home agent having a global IP address that is a home address common to the mobile node and one or more of other mobile nodes, the mobile node comprising:
    an interface unit configured to send and receive a packet;
    a detection unit configured to detect a change in at least one of a home address of the mobile node, a care of address of the mobile node and a communication session identification number for identifying a communication session opened by an application of the mobile node, wherein the mobile node sends change information indicating the change detected by the detection unit to the home agent when the application generates a communication socket,
    wherein a packet transferred from the home agent according to a transfer table is received by the interface unit,
    wherein the transfer table includes a correspondence among the home address of the mobile node, the care of address of the mobile node, and the communication session identification number, with respect to each of a plurality of mobile nodes, and
    wherein a transfer destination of the packet is identified by a combination of the care of address and the communication session identification number.

11. The mobile node as claimed in claim 10, wherein the communication session identification number used by the mobile node is issued by the home agent.

12. The mobile node as claimed in claim 10, wherein
    a plurality of global IP addresses are provided wherein each of the plurality of global IP addresses is a home address common to the mobile node and one or more of other mobile nodes, and transfer tables each corresponding to one of the global IP addresses are provided, and
    when a communication session identification number overlaps among the mobile nodes, the communication session identification number is registered in different transfer tables from one which is already registered so that overlapping of the communication session identification number is allowed.

13. The mobile node as claimed in claim 10, wherein the mobile node receives the home address from the home agent when the mobile node launches.

14. A method used in a mobile communications system, conforming to Mobile IP, comprising:
- a home agent having a global IP address; and
- a mobile node belonging to the home agent,
- wherein the global IP address is a home address common to a plurality of mobile nodes,
- wherein the home agent prepares a transfer table,
- wherein the home agent routes a received packet according to the transfer table, wherein the transfer table includes a correspondence among a home address of the mobile node, a care of address of the mobile node, and a communication session identification number for identifying a communication session opened by an application of the mobile node, with respect to each of the plurality of mobile nodes, wherein a transfer destination of the received packet is identified by a combination of the care of address and the identification number,
- wherein the mobile node detects a change in at least one of the home address of the mobile node, the care of address of the mobile node and the communication session identification number, and sends change information indicating the change that is detected to the home agent, and
- wherein the home agent updates the transfer table according to the change information.

15. The method as claimed in claim 14, wherein the home agent designates a communication session identification number so as to avoid that the communication session identification number is used by a plurality of mobile nodes, and sends the communication session identification number to the mobile node.

16. The method as claimed in claim 15, wherein, when there are competing demands by more than one mobile node for a communication session identification number, the home agent designates communication session identification numbers so as to avoid the competition.

17. The method as claimed in claim 15, wherein, when the mobile node does not designate a communication session identification number used by the mobile node, the home agent issues an uncompetitive communication session identification number to the mobile node.

18. The method as claimed in claim 14, wherein
- a plurality of global IP addresses are provided wherein each of the plurality of global IP addresses is a home address common to the plurality of mobile nodes, and transfer tables each corresponding to one of the global IP addresses are provided, and
- when a communication session identification number overlaps among mobile nodes, the communication session identification number is registered in different transfer tables from one which is already registered so that overlapping of the communication session identification number is allowed.

19. The method as claimed in claim 14, wherein the home agent sends the home address to the mobile node when the mobile node is launched.

20. The method as claimed in claim 14, wherein, when the home address is changed, the home agent updates the transfer table before sending an updated home address to the mobile node.

21. The method as claimed in claim 14, wherein, when the home address is changed, the home agent updates the transfer table after sending a changed home address to the mobile node and receiving information indicating that the home address is changed from the mobile node.

* * * * *